United States Patent [19]
Kurematsu et al.

[11] Patent Number: 5,170,194
[45] Date of Patent: Dec. 8, 1992

[54] REFLECTION TYPE LIQUID CRYSTAL VALVE AND PROJECTOR HAVING THE SAME

[75] Inventors: Katsumi Kurematsu, Kawasaki; Nobuo Minoura, Yokohama; Haruyuki Yanagi, Yokohama; Masaaki Kanashiki, Yokohama, all of Japan

[73] Assignee: Canon Kabushiki Kaisha, Tokyo, Japan

[21] Appl. No.: 633,052

[22] Filed: Dec. 21, 1990

[30] Foreign Application Priority Data

Dec. 26, 1989 [JP] Japan ................. 1-334999

[51] Int. Cl.⁵ .................................. G03B 21/16
[52] U.S. Cl. ........................... 353/52; 359/62; 359/70
[58] Field of Search .......... 353/52, 55, 56; 359/38, 359/62, 69, 70, 40, 86

[56] References Cited

U.S. PATENT DOCUMENTS 4,772,098  9/1988  Ogawa ..................... 350/331 T
5,032,021  7/1991  Kanatani et al. ................. 353/52

FOREIGN PATENT DOCUMENTS 0294230  12/1987  Japan .
0296126  12/1987  Japan .
0220113   9/1988  Japan .

Primary Examiner—Thomas B. Will
Assistant Examiner—William C. Dowling
Attorney, Agent, or Firm—Morgan & Finnegan

[57] ABSTRACT

A reflection type liquid crystal light valve comprises a first transparent substrate, a second transparent substrate for supporting the liquid crystal layer together with the first transparent substrate therebetween, a driver for driving liquid crystal molecules of the liquid crystal layer to modulate a light directed to the liquid crystal layer through the first transparent substrate, and a heat sink substrate attached to the second transparent substrate and having a reflection plane for reflecting the light directed thereto through the second transparent substrate to the first transparent substrate, on a plane thereof facing the second transparent substrate.

19 Claims, 2 Drawing Sheets

5,170,194

REFLECTION TYPE LIQUID CRYSTAL VALVE AND PROJECTOR HAVING THE SAME

BACKGROUND OF THE INVENTION

1. Field of the Invention

The present invention relates to a reflection type light value and a projector which uses the light value as a display.

2. Related Background Art

A projector which uses a liquid crystal display (LCD) which functions as a light value includes a transmission LCD type as shown in Japanese Laid-Open Utility Model Application No. 63-54137 and a reflection LCD type as shown in Japanese Laid-Open Patent Application No. 61-13885.

In such a projector, since a strong light is irradiated to the LCD, a temperature of a liquid crystal layer of the LCD rises and a quality of image is lowered by a change in liquid crystal molecules of the liquid crystal layer due to the temperature rise.

In the projector which uses the transmission type LCD, a heat sink device by forced air cooling or liquid cooling which also serves as an optical coupling has been proposed (Japanese Laid-Open Utility Model Application Nos. 63-54137 and 63-128523). However, no heat sink device has been proposed for the LCD in the projector which uses the reflection type LCD.

SUMMARY OF THE INVENTION

It is an object of the present invention to provide a simple reflection type liquid crystal light value which can suppress temperature rise, and a projector type which uses the light value as a display.

In order to achieve the above object, in accordance with a first aspect of the present invention, a reflection type liquid crystal light value comprises: a first transparent substrate; a liquid crystal layer; a second transparent substrate for supporting together with said first transparent substrate said liquid crystal layer therebetween; drive means for driving liquid crystal molecules of said liquid crystal layer for modulating a light directed to said liquid crystal layer through said first transparent substrate; and a heat sink substrate mounted on said second transparent substrate and having a reflection plane for reflecting the light directed thereto through said second transparent substrate to said first transparent substrate, on a plane facing said second transparent substrate.

In order to achieve the above object, in accordance with a second aspect of the present invention, a reflection type liquid crystal light value comprises; a transparent substrate; a liquid crystal layer; a heat sink substrate for holding said liquid crystal layer together with said transparent substrate and having a reflection surface on a plane thereof facing said liquid crystal layer for reflecting a light directed thereto through said transparent substrate and said liquid crystal layer to said transparent substrate; and drive means for driving liquid crystal molecules of said liquid crystal layer for modulating the light.

In order to achieve the above object, in accordance with a third aspect of the present, invention, a reflection type liquid crystal light value comprises: a transparent substrate having a transparent electrode; a liquid crystal layer; a conductive heat sink substrate for supporting said liquid crystal layer together with said transparent substrate therebetween and having a reflection plane for reflecting a light directed thereto through said transparent substrate and said liquid crystal layer to said transparent substrate, on a plane thereof facing said liquid crystal layer; and drive means for applying an electric field to said liquid crystal layer through said transparent electrode and said heat sink substrate for modulating the light to drive liquid crystal molecules of said liquid crystal layer.

In a preferred aspect of the present invention, the heat sink substrate material is selected from aluminum, aluminum nitride, nickel, silver and copper. The liquid crystal layer is selected depending on the type of the light value. For example, a twisted nematic liquid crystal layer, a scatter mode liquid crystal layer, an ECB (electrically controlled birefringence) liquid crystal layer, or a guest-host mode liquid crystal layer may be used.

In a preferred aspect of the present invention, the heat sink substrate has a heat sink fin, which is forcebly air-cooled by a blower to enhance the suppression effect of the temperature rise of the light value.

A projector of the present invention comprises means for supplying a light and means for modulating and reflecting the light to generate an image, which is projected on a screen. The image generation means has the liquid crystal light value of one of the first to third aspects described above, as a display. The projector can always project a high quality image because the temperature rise of the display is suppressed.

DETAILED DESCRIPTION OF THE PREFERRED EMBODIMENTS

Figure 1:
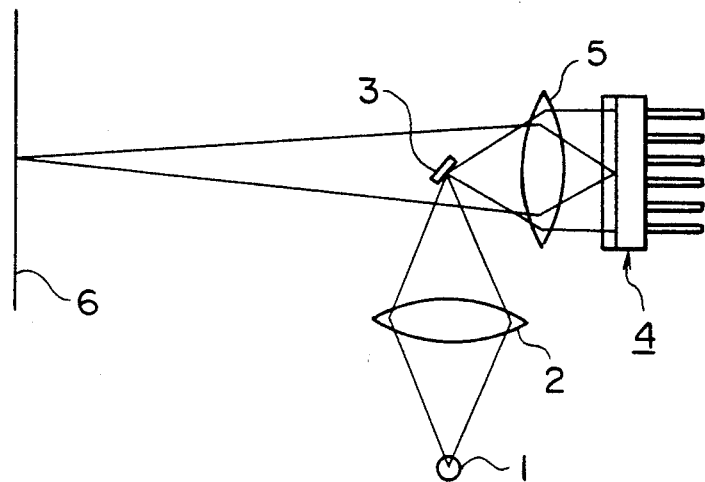
FIG. 1 shows a main portion of a first embodiment of a projector which uses a reflection type liquid crystal display of the present invention.
Figure 2:
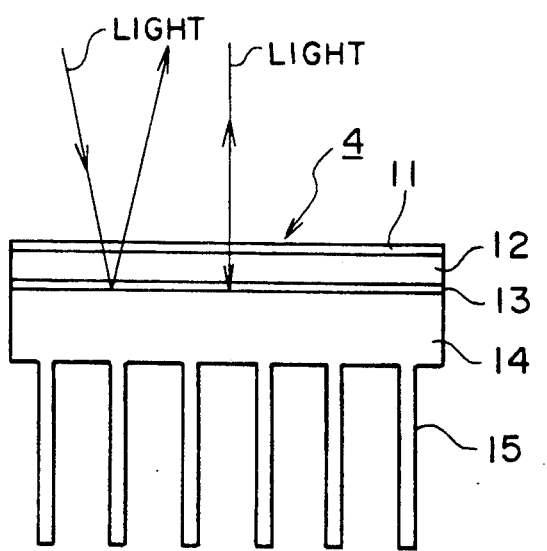
FIG. 2 shows a sectional view of an integrated heat sink/LCD 4 of FIG. 1.

FIG. 1 shows a main portion of a first embodiment of a projector which uses a reflection type liquid crystal display of the present invention, and FIG. 2 shows a sectional view of an integrated heat sink/LCD 4 of FIG. 1.

The projector comprises a light source 1 which emits a white light ray, a condenser lens 2 for condensing the white light ray to a mirror 3 which directs the condensed white light ray to an integrated heat sink/LCD 4 which has a reflection type LCD and a heat sink therefor integrated for modulating the directed white light ray by a video signal, a projection lens 5 for projecting the modulated white light ray (image) to a screen 6 which forms an image thereon by the projected white light ray.

As shown in FIG. 2, the integrated heat sink/LCD 4 comprises a polarization filter 11 which converts the directed white light ray to a linearly polarized light, a simple matrix driven liquid crystal panel 12 having one plane thereof bonded to the polarization filter 11 and mode of twisted nematic (TN) liquid crystal which rotates a polarization plane of the linearly polarized light in accordance with an image signal, a polarization filter 13 having one plane bonded to the other plane of the liquid crystal panel 12 and having a polarization axis which is parallel to a polarization axis of the filter 11 for transmitting a linearly polarized light having a polarization plane which passes through the polarization filter 11 and absorbing a linearly polarized light having a polarization plane which is orthogonal to the above linearly polarized light, a heat sink substrate 14 mode of aluminum, aluminum nitride, nickel or silver having a mirror surface formed on a plane which is bonded to the other plane of the polarization filter 13, and a heat sink fin 15 provided on the other surface of the heat sink substrate 14.

In the integrated heat sink/LCD 4, the plane of the heat sink substrate 14 which is bonded to the polarization filter 13 functions as a reflection mirror because the bonding plane is the mirror surface. Accordingly, the heat sink substrate 14, the two polarization filters 11 and 13 and the liquid crystal panel 12 form the reflection type LCD. Accordingly, in this integrated heat sink/LCD 4, the heat sink substrate 14 functions as the reflection mirror of the reflection type LCD and hence a compact LCD is provided.

The liquid crystal panel 12 supports a liquid crystal layer by a pair of transparent substrates and an electric field is applied to the liquid crystal layer through transparent electrodes arranged to face the liquid crystal layer on the substrates. By selectively applying the electric field to the liquid crystal layer in accordance with a video signal, the drive of liquid crystal molecules of the liquid crystal layer is controlled so that the light directed to the panel is modulated with the cooperation of the polarization filters 11 and 13.

The white light ray directed to the LCD 4 by the mirror 3 and the lens 5 (FIG. 1) is converted to a linearly polarized light by the polarization filter 11. In the TN liquid crystal, those linearly polarized lights which irradiate picture elements corresponding to bright areas of the image on the panel 12 (picture elements to which the electric field is applied) have the polarization planes thereof not rotated when the lights pass through the liquid crystal panel 12. Accordingly, they are reflected by the mirror surface of the heat sink substrate 14 as shown in FIG. 1 and projected to the screen 6 through the projection lens 5 of FIG. 1. On the other hand, those linearly polarized lights which irradiate picture elements corresponding to dark areas of the image on the panel 12 (picture elements to which the electric field is not applied) have the polarization planes thereof rotated by 90 degrees when they pass through the liquid crystal panel 12 by the action of the twisted nematic liquid crystal. Accordingly, they are absorbed by the polarization filter 13 and are not projected onto the screen 6 shown in FIG. 1. As a result, since the polarization filter 13 absorbs the linearly polarized light irradiated to the picture elements corresponding to the dark areas of the image, a temperature rises, and this causes the temperature rise of the liquid crystal panel 12 bonded to the polarization filter 13. However, since the heat sink substrate 14 is bonded to the other plane of the polarization filter 13, the temperature rise created in the polarization filter 13 is efficiently dissipated through the heat sink substrate 14 and the heat sink fin 15 so that the temperature rise of the liquid crystal panel 12 is prevented. The heat sink effect may be further enhanced by forcedly air-cooling by a blower or liquid-cooling the heat sink fin 15.

In the above description, the liquid crystal panel 12 shown in FIG. 2 is the simple matrix driven liquid crystal panel having the TN liquid crystal, although a TFT active matrix driven liquid crystal panel having TN liquid crystal may be used.

Figure 3:
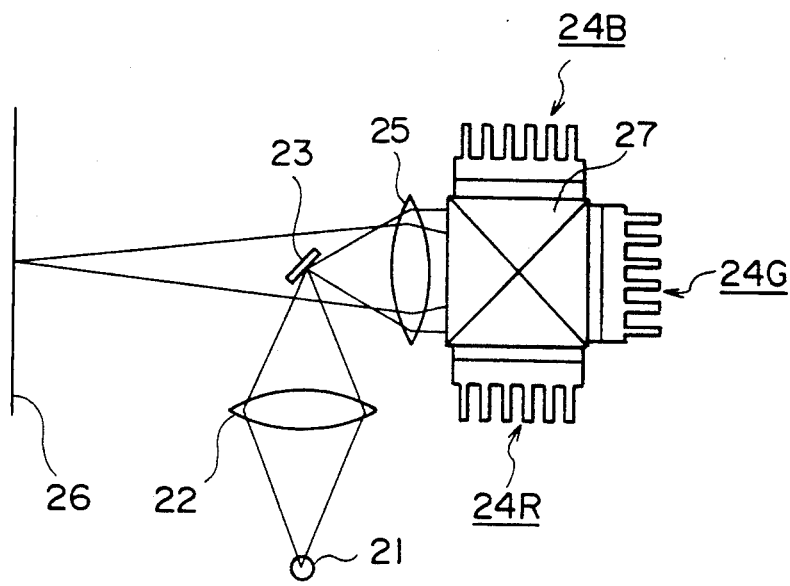
FIG. 3 shows a main portion of a second embodiment of a projector which uses the reflection type liquid crystal display of the present invention.

FIG. 3 shows a main portion of a second embodiment of a projector which uses the reflection type liquid crystal display of the present invention.

In this projector, a white light ray emitted from a light source 21 is directed to one plane of a cross-dichroic cube 27 through a condenser lens 22 and a mirror 23 so that it is decomposed to red, green and blue lights, which are directed to integrated heat sink/LCD $24_R$, $24_G$ and $24_B$ of the same structure as that of the integrated heat sink/LCD 4, arranged on other three planes of the dichroic cube 27 and modulated by red, green and blue components of the video signal. The modulated lights are reflected by the mirror surface of the heat sink substrate 14 (FIG. 2) and they are combined by the cross-dichroic cube 27 and projected onto the screen 26 by the projection lens 25.

In the present embodiment, by the use of the integrated head sink/LCD's $24_R$, $24_G$ and $24_B$ of the structure shown in FIG. 2, the temperature rise of the liquid crystal panel in each LCD can be prevented and a high quality image is formed on the screen 26.

Figure 4:
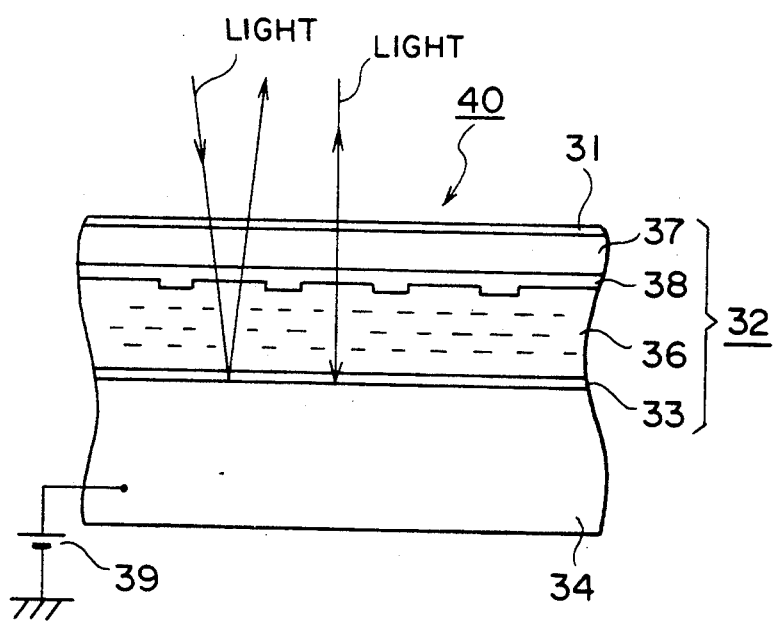
FIG. 4 shows a sectional view of another embodiment of an integrated heat sink/LCD.

FIG. 4 shows a sectional view of another embodiment of the integrated heat sink/LCD.

An integrated heat sink/LCD 40 comprises a polarization filter 31 for converting an incident light to a linearly polarized light, a panel 32 having one plane bonded to the polarization filter 31 for rotating the polarization plane of the linearly polarized light in accordance with the image signal, a polarization filter 33 having one plane bonded to the other plane of the panel 32 and having a polarization axis of the same direction as that of the filter 31 for transmitting a linearly polarized light having a polarization plane which passes through the polarization filter 31 and absorbing a linearly polarized light having a polarization plane which is orthogonal to the above linearly polarized light, and a heat sink substrate 34 having a mirror surface formed in a plane bonded to the other plane of the polarization filter 33, made of aluminum, nickel, silver or copper and connected to a DC power supply 39. The panel 32 comprises a glass substrate 37 having one plane thereof bonded to the polarization filter 31, a matrix electrode 38 having insulated row electrodes and column electrodes formed on the other plane of the glass substrate 37, and a TN liquid crystal 36 driven by an active matrix of thin film transistors (TFT) (not shown) formed near the crosspoints of the row electrodes and the column electrodes on the glass substrate 37.

In the integrated heat sink/LCD 40, the heat sink substrate 34 functions as the reflection mirror as does the heat sink substrate 14 of FIG. 2, and it is connected to the DC power supply 39 to function as a counter electrode of the matrix electrode 38 for applying the electric field so that the liquid crystal 36 is driven by the TFT of the active matrix.

In the integrated heat sink/LCD 40, the heat of the liquid crystal 36 is efficiently dissipated through the heat sink substrate 34 which is provided integrally with the panel 32. The heat sink effect may be further enhanced by providing a heat sink fin with the heat sink substrate 34 and forcedly air-cooling by a blower or liquid-cooling the heat sink fin. Accordingly, the integrated heat sink/LCD 40 may be used in place of the integrated heat sink/LCD 4 of FIG. 1 or the integrated heat sink/LCD's $24_R$, $24_G$ and $24_B$ of FIG. 3 to provide a projector which attains a high quality image.

In the above description, the liquid crystal used for the liquid crystal panel 12 shown in FIG. 2 and the liquid crystal 36 shown in FIG. 3 are of TN type, although they may be of ECB (electrically controlled birefringence) type. In this case, the polarization filter 13 shown in FIG. 2 and the polarization filter 33 shown in FIG. 4 are not necessary. A scatter mode type or GH (guest-host) mode type liquid crystal may be used for the panel.

A polarization beam splitter may be used in place of the polarization filter 11 shown in FIG. 2 or the polarization filter 31 shown in FIG. 4.

The projector which uses the reflection type liquid crystal display of the present invention is not limited to those shown in FIGS. 1 and 3 but it may be constructed as shown in Japanese Laid-Open Patent Application No. 61-13885.

The projector which uses the reflection type display of the present invention may use a half-mirror, instead of the mirrors 3 and 23 shown in FIGS. 1 and 3, which is large enough to cover a light path of the image forming light between the LCD's 4 and 24 and the screens 6 and 26.

The material of the heat sink substrate is not limited to those described above but the heat sink substrate may be formed by forming a high reflectivity metal film such as aluminum or aluminum alloy on a high thermal conductivity substrate.

We claim:

1. A reflection type liquid crystal light bulb comprising:
   a first transparent substrate;
   a liquid crystal layer;
   a second transparent substrate for supporting together with said first transparent substrate said liquid crystal layer therebetween;
   drive means for driving liquid crystal molecules of said liquid crystal layer for modulating a light directed to said liquid crystal layer through said first transparent substrate; and
   a heat sink substrate mounted on said second transparent substrate and having a reflection plane for reflecting the light directed thereto through said second transparent substrate to said first transparent substrate, on a plane facing said second transparent substrate.

2. A reflection type liquid crystal light value according to claim 1 wherein said drive means has first and second transparent electrodes, said first transparent electrode being formed on a plane of said first transparent substrate facing said liquid crystal layer and said second transparent electrode being formed on a plane of said second transparent substrate facing said liquid crystal layer, and said drive means applies an electric field to said liquid crystal layer through said first and second transparent electrodes to drive liquid crystal molecules of said liquid crystal layer.

3. A reflection type liquid crystal light value according to claim 2 wherein said first transparent substrate has a first polarization filter on a plane opposite to said liquid crystal layer, and said second transparent substrate has a second polarization filter having a polarization axis parallel to a polarization axis of said first polarization filter on a plane opposite to said liquid crystal layer.

4. A reflection type liquid crystal light value according to any one of claims 1 to 3 wherein said heat sink substrate is made of aluminum.

5. A reflection type liquid crystal light value according to any one of claims 1 to 3 wherein said heat sink substrate is made of aluminum nitride.

6. A reflection type liquid crystal light value according to any one of claims 1 to 3 wherein said heat sink substrate has a heat sink fin.

7. A reflection type liquid crystal light value comprising:
   a transparent substrate;
   a liquid crystal layer;
   a heat sink substrate for holding said liquid crystal layer together with said transparent substrate and having a reflection surface on a plane thereof facing said liquid crystal layer for reflecting a light directed thereto through said transparent substrate and said liquid crystal layer to said transparent substrate; and
   drive means for driving liquid crystal molecules of said liquid crystal layer for modulating the light.

8. A reflection type liquid crystal light value according to claim 7 wherein said drive means has a transparent electrode formed on a plane of said transparent substrate facing said liquid crystal layer, and said drive means applies an electric field to said liquid crystal layer through said transparent electrode and said heat sink substrate to drive liquid crystal molecules of said liquid crystal layer.

9. A reflection type liquid crystal light value according to claim 8 wherein said transparent substrate has a first polarization filter on a plane thereof opposite to said liquid crystal layer, and said heat sink substrate has a second polarization filter having a polarization axis parallel to a polarization axis of said first polarization filter on said reflection plane.

10. A reflection type liquid crystal light value according to any one of claims 7 to 9 wherein said heat sink substrate is made of aluminum.

11. A reflection type liquid crystal light value according to any one of claims 7 to 9 wherein said heat sink substrate is made of copper.

12. A reflection type liquid crystal light value according to any one of claims 7 to 9 wherein said heat sink substrate has a heat sink fin.

13. A reflection type liquid crystal light value comprising:
   a transparent substrate having a transparent electrode;
   a liquid crystal layer;
   a conductive heat sink substrate for supporting said liquid crystal layer together with said transparent substrate therebetween and having a reflection plane for reflecting a light directed thereto through said transparent substrate and said liquid crystal layer to said transparent substrate, on a plane thereof facing said liquid crystal layer; and
   drive means for applying an electric field to said liquid crystal layer through said transparent electrode and said heat sink substrate for modulating the light to drive liquid crystal molecules of said liquid crystal layer.

14. A reflection type liquid crystal light value according to claim 13 wherein said heat sink substrate is made of aluminum.

15. A reflection type liquid crystal light value according to claim 13 wherein said heat sink substrate is made of copper.

16. A reflection type liquid crystal light value according to any one of claims 13 to 15 wherein said heat sink substrate has a heat sink fin.

17. A projector comprising:
means for supplying a light; and
means for modulating and reflecting the light to generate an image, including;
a first transparent substrate;
a liquid crystal layer;
a second transparent substrate for supporting said liquid crystal layer together with said first transparent substrate therebetween;
drive means for driving liquid crystal molecules of said liquid crystal layer in accordance with a video signal to modulate the light directed to said liquid crystal layer through said first transparent substrate to generate the image; and
a heat sink substrate attached to said second transparent substrate and having a reflection plane for reflecting the light directed thereto through said second transparent substrate to said first transparent substrate, on a plane thereof facing said second transparent substrate.

18. A projector comprising:
means for supplying a light; and
means for modulating and reflecting the light to generate an image, including;
a transparent substrate;
a liquid crystal layer;
a heat sink substrate for supporting said .i liquid crystal layer together with said transparent substrate therebetween, and having a reflection plane for reflecting a light directed thereto through said transparent substrate and said liquid crystal layer to said transparent substrate, on a plane thereof facing said liquid crystal layer; and
drive means for driving liquid crystal molecules of said liquid crystal layer in accordance with a video signal for modulating the light to generate the image.

19. A projector comprising:
means for supplying a light; and
means for modulating and reflecting the light to generate an image, including;
a transparent substrate having a transparent electrode;
a liquid crystal layer;
a conductive heat sink substrate for supporting said liquid crystal layer together with said transparent substrate therebetween and having a reflection plane for reflecting a light directed thereto through said transparent substrate and said liquid crystal layer to said transparent substrate, on a plane thereof facing said liquid crystal layer; and
drive means for applying an electric field to said liquid crystal layer through said transparent electrode and said heat sink substrate in accordance with a video signal to drive liquid crystal molecules of said liquid crystal layer to modulate the light to generate the image.

* * * * *